Patented Mar. 7, 1950

2,499,833

UNITED STATES PATENT OFFICE 2,499,833

METHOD OF MAKING FLUORINATED ORGANIC COMPOUNDS

Melvin A. Perkins, Wilmington, Del., assignor to the United States of America as represented by the United States Atomic Energy Commission No Drawing. Application July 27, 1944, Serial No. 546,916

3 Claims. (Cl. 260—648)

This invention relates to new halogen compounds and to methods for their production.

It is an object of the invention to provide products of high thermal stability and inertness to chemical reagents, particularly oxidizing agents, acids, bases and metals. A further object is the provision of products suitable for use as heat transfer media, lubricants and sealants. Further objects will appear from the following detailed description of the invention.

In my United States patent application Serial Number 546,915 entitled "Halogenated organic compounds and method of making," filed on the same date herewith, which became U. S. Patent No. 2,485,507 on October 18, 1949, there is described a process for the manufacture of chlorinated hydrocarbons of the molecular formulae $C_8H_5Cl_{11}$, $C_8H_4Cl_{10}$, $C_8H_3Cl_9$ and $C_8H_2Cl_8$ by the condensation of trichlorethene with a Prins type dimer of a dihydroperchloropropene containing only one hydrogen atom in 1-position, with or without subsequent dehydrochlorination of the product. The condensation product has the structural formula

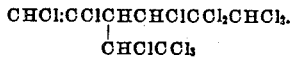

I have now found that the products so prepared may be fluorinated by means of fluorinating agents such as antimony and arsenic pentafluorides, cobalt trifluoride, manganese trifluoride and silver difluoride to produce cyclic fluorocarbons and chloro-fluorocarbons of the general formula, $C_8Cl_xF_{16-x}$, in which $x$ may be zero or a positive integer less than 12.

The fluorinating agents $CoF_3$, $MnF_3$ and $AgF_2$ replace hydrogen and saturate double bonds more readily than they replace chlorine. Hence by treating the initial material with one of these reagents directly, cyclization products of high chlorine content containing five or more fluorine atoms may be produced. By prolonged and vigorous treatment with these reagents the chlorine content can be further replaced by fluorine.

The fluorides and the fluorochlorides of pentavalent antimony and arsenic, on the other hand, replace chlorine with greater facility than they replace hydrogen. Consequently in order to obtain saturated cyclic compounds of high fluorine content, which are the preferred products of the invention, it is desirable to employ an antimony or arsenic fluorinating agents to reduce the chlorine content and a reagent of the group consisting of cobalt trifluoride, manganese trifluoride and silver difluoride to replace hydrogen and saturate any residual double bonds.

The products have densities in the neighborhood of 1.8 and refractive indices of about 1.3 (sodium-D-line) at 23° C. They are usually obtained in the crude state as mixtures of compounds of the molecular formulae $C_8F_{16}$, $C_8ClF_{15}$, $C_8Cl_2F_{14}$ and other chloro-fluorocarbons, from which the individual constituents may be obtained by fractional distillation. The products possess a high degree of stability to oxidizing agents, acids, bases and metals, and the stability increases with the degree of fluorination. Thus the compound $C_8F_{16}$ is the most stable compound of the group and the compound $C_8ClF_{15}$ is only slightly less stable.

The products may be used for any purpose for which an inert fluorocarbon or chlorofluorocarbon is suitable. For instance, they may be used in the crude state or after isolation, as coolants, sealants and lubricants, or as reaction media for conducting chemical reactions.

In the manufacture of the products of the present invention from the products of my United States patent application Serial Number 546,915, it is preferred to employ a partially dehydrochlorinated compound or mixture of compounds having an average molecular formula of about $C_8H_3Cl_9$. Compounds containing a greater proportion of hydrogen may be used as initial materials for the fluorination process, but hydrogen in the organic compound consumes fluorine to form hydrogen fluoride and thus the total quantity of fluorinating agent required increases with the hydrogen content. Moreover the compounds of higher hydrogen content react violently with a fluorinating agent such as antimony pentafluoride and the process is accordingly difficult to control. Although the dehydrochlorinated products having the average molecular formula $C_8H_3Cl_9$ may include small proportions of the compounds $C_8H_5Cl_{11}$ and $C_8H_4Cl_{10}$, these latter compounds are sufficiently diluted by the more highly dehydrochlorinated compounds so that the reaction with antimony pentafluoride can be readily controlled.

When fluorochlorides of pentavalent antimony are used in place of antimony pentafluoride, the fluorination proceeds with difficulty and only a minor proportion of the chlorine is replaced by fluorine. Consequently, to replace a major proportion of the chlorine, the fluorination must be continued with antimony pentafluoride.

It is preferred to employ the antimony pentafluoride treatment directly upon the dehydrochlorinated compounds without using a preliminary fluorochloride treatment. The antimony pentafluoride treatment may be carried out at a temperature between 100° and 300° C. This treatment not only effects a replacement of chlorine by fluorine, but at the same time effects a cyclization of the compound and at least to this extent, reduces the number of double bonds present in the molecule. The antimony pentafluoride may also saturate some of the double bonds by direct fluorination; but ordinarily by a one-step or two-step treatment with antimony pentafluoride, products are obtained which retain a substantial degree of unsaturation. The antimony pentafluoride treatment may replace part of the hydrogen present by fluorine, but the proportion of the total hydrogen so replaced is small. The proportion of chlorine in the product can be controlled by the extent of fluorination in the antimony pentafluoride step. Thus by employing a relatively small proportion of antimony pentafluoride, a product of high chlorine content can be obtained whereas by increasing the proportion of antimony pentafluoride or by employing repeated fluorinations with this reagent, the chlorine content can be reduced to a very small value.

The fluorination with cobalt trifluoride, manganese trifluoride or silver difluoride is preferably conducted at temperatures between 150° and 400° C. with the partially fluorinated material in vapor phase. This finishing treatment not only replaces all of the residual hydrogen by fluorine but also saturates residual double bonds so that a saturated cyclic product is obtained.

The final fluorination step to replace hydrogen may reduce the proportion of chlorine in those compounds containing relatively high proportions of chlorine. However, the final one or two chlorine atoms are relatively resistant to the fluorinating agents employed in this step and consequently products containing one or two atoms of chlorine per molecule may be passed through this finishing step without substantially reducing their chlorine content, expressed as atoms per molecule.

The following example will further illustrate the invention. (Quantities are expressed as parts by weight.)

*Example*

78 parts of a product having the average molecular formula $C_8H_3Cl_9$ and obtained by dehydrohalogenating the condensation product of 1,2,3,4,5,5,6,6-octachloro-n-hexene and trichlorethene in the presence of anhydrous aluminum chloride as described in my United States patent application Serial Number 546,915 were mixed with 273 parts of $SbF_5$.

The mixture was placed in a nickel bomb which was heated for 4 hours at 180° C. in a shaking machine. The product was then allowed to cool to room temperature. The contents of the bomb stratified, and the upper organic layer was decanted off from the lower antimony fluorochloride layer. 64 parts of organic product were obtained.

60 parts of this organic product were mixed with 205 parts of fresh $SbF_5$, and the mixture was heated in a nickel bomb for 8 hours at 180° C. in a shaking machine. The bomb was then cooled, and the organic product was separated from antimony salts by decantation. 48 parts of organic product were thus obtained.

This product was washed with water, separated from wash-water and dried by mixing it with anhydrous sodium sulfate. Upon separating the sodium sulfate, there were obtained 41 parts of an amber-colored oil having a density of 1.78 at 20° C. and a refractive index (sodium-D-line) of 1.33 at 20° C.

27 parts of this oil were vaporized and passed into contact with cobalt trifluoride maintained at a temperature between 300° and 320° C. The product was condensed and comprised 20 parts of an oil having a density of 1.82 at 24° C. and a refractive index of 1.31 at the same temperature.

The product was washed with water, dried by shaking it with anhydrous sodium sulfate, filtered, and distilled at normal atmospheric pressure. The following fractions were obtained:

(a) Below 70° C., 0.8 parts;
(b) From 70° to 83° C., 0.5 parts;
(c) From 83° to 90° C., 0.6 parts;
(d) From 90° to 100° C., 1.0 parts;
(e) From 100° to 110° C., 3.8 parts;
(f) From 110° to 120° C., 2.7 parts;
(g) From 120° to 132° C., 3.9 parts;
(h) Residue above 132° C., 5.5 parts.

Fraction (e), most of which distilled at 104° to 107° C., had a refractive index of 1.304 at 24.5° C., a chlorine content of 7.4%, and a molecular weight of 377. The low molecular weight indicates that this product contained decomposition products and was probably a mixture of $C_8$ compounds with $C_7$ and perhaps $C_6$ compounds.

Fraction (g), which distilled principally in two temperature ranges, the first, 123 to 125° C., and the second, 129° to 132° C., exhibited the following characteristics:

(a) Refractive index (24.5° C.): 1.312;
(b) Chlorine content: 6.6%;
(c) Density (24° C.): 1.79;
(d) Molecular weight: 415.

From its chlorine content and molecular weight, it is evident that the product consisted of a mixture of fluorocarbon, $C_8F_{16}$, and fluorocarbon monochloride, $C_8ClF_{15}$, in a ratio of about 1 to 3.

It will be understood that I intend to include variations and modifications of the invention and that the preceding example is an illustration only and in no wise to be construed as a limitation upon the invention, the scope of which is defined in the appended claims, wherein I claim:

1. The method of making mixtures of saturated fluorocarbons and chloro-fluoro-carbons having molecular formulae selected from the group $C_8F_{16}$, $C_8ClF_{15}$ and $C_8Cl_2F_{14}$, which comprises reacting an unsaturated chlorine containing aliphatic compound having 8 carbon atoms selected from the group consisting of an undecachloro-octene having the structural formula

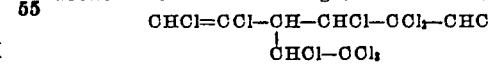

and its dehydrochlorination products having the molecular formulae $C_8H_4Cl_{10}$, $C_8H_3Cl_9$ and $C_8H_2Cl_8$ with a fluorinating agent selected from the group consisting of the pentavalent fluorides of antimony and arsenic to obtain a fluorinated product in which most of the chlorine atoms have been replaced by fluorine atoms, and then reacting said fluorinated product with a fluorinating agent selected from the group consisting of cobalt trifluoride, manganese trifluoride and silver difluoride in order to replace residual hydrogen with fluorine and to saturate residual double bonds with fluorine so that a saturated product is obtained.

2. The method of making mixtures of saturated fluorocarbons and chloro-fluorocarbons having molecular formulae selected from the group $C_8F_{16}$, $C_8ClF_{15}$ and $C_8Cl_2F_{14}$, which comprises reacting an unsaturated chlorine containing aliphatic product having an average molecular formula of $C_8H_3Cl_9$, which has been obtained by the dehydrochlorination of an undecachlorooctene having the structural formula

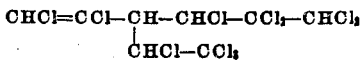

with antimony pentafluoride at a temperature between 100° and 300° C. to obtain a fluorinated product in which most of the chlorine atoms have been replaced by fluorine atoms, and then reacting the resulting fluorinated product with a fluorinating agent of the group consisting of cobalt trifluoride, manganese trifluoride and silver difluoride at a temperature between 150° and 400° C. in order to replace residual hydrogen with fluorine and to saturate residual double bonds with fluorine so that a saturated product is obtained.

3. The method of making mixtures of saturated fluorocarbons and chloro-fluorocarbons having molecular formulae selected from the group $C_8F_{16}$, $C_8ClF_{15}$ and $C_8Cl_2F_{14}$, which comprises reacting an unsaturated chlorine containing aliphatic product having an average molecular formula of $C_8H_3Cl_9$, which has been obtained by the dehydrochlorination of an undeca-chlorooctene having the structural formula

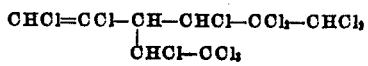

with sufficient antimony pentafluoride at a temperature between 100° and 300° C. to obtain a fluorinated product in which all but about one chlorine atom per molecule has been replaced by fluorine, and fluorinating the resulting fluorinated product at a temperature between 150° and 400° C. with sufficient cobalt trifluoride to replace residual hydrogen with fluorine and to saturate residual double bonds with fluorine so that a saturated product is obtained.

MELVIN A. PERKINS.

REFERENCES CITED

The following references are of record in the file of this patent:

UNITED STATES PATENTS

| Number | Name | Date |
| --- | --- | --- |
| 2,005,711 | Daudt et al. | June 18, 1935 |
| 2,426,172 | Benning | Aug. 26, 1947 |
| 2,456,027 | Simons | Dec. 14, 1948 |

FOREIGN PATENTS

| Number | Country | Date |
| --- | --- | --- |
| 786,123 | France | Aug. 27, 1935 |

OTHER REFERENCES

Henne et al., "J. Am. Chem. Soc.," vol. 61, page 938 (1939).

Simons et al., "J. Am. Chem. Soc.," vol. 61, pages 2963-6 (1939).

Fukuhara et al., "J. Am. Chem. Soc.," vol. 63, pages 2792-5 (1941).

Certificate of Correction

Patent No. 2,499,833 March 7, 1950

MELVIN A. PERKINS

It is hereby certified that errors appear in the printed specification of the above numbered patent requiring correction as follows:

Column 1, line 53, for the word "agents" read *agent*; column 4, line 55, for that portion of the formula reading "$CCl_2$–$CHC$" read $CCl_2$–$CHCl_2$;

and that the said Letters Patent should be read with these corrections therein that the same may conform to the record of the case in the Patent Office.

Signed and sealed this 18th day of July, A. D. 1950.

[SEAL]

JOE E. DANIELS,
*Assistant Commissioner of Patents.*